(12) United States Patent
Watanabe et al.

(10) Patent No.: US 12,491,631 B2
(45) Date of Patent: Dec. 9, 2025

(54) ROBOT AUTOMATION SYSTEM

(71) Applicant: KABUSHIKI KAISHA YASKAWA DENKI, Kitakyushu (JP)

(72) Inventors: Wataru Watanabe, Fukuoka (JP);
Makoto Takahashi, Fukuoka (JP);
Masahiro Goya, Fukuoka (JP);
Tomoaki Uchida, Fukuoka (JP);
Satoshi Hironaka, Fukuoka (JP)

( * ) Notice: Subject to any disclaimer, the term of this patent is extended or adjusted under 35 U.S.C. 154(b) by 129 days.

(21) Appl. No.: 18/527,390

(22) Filed: Dec. 4, 2023

(65) Prior Publication Data
US 2024/0091936 A1    Mar. 21, 2024

Related U.S. Application Data

(63) Continuation of application No. PCT/JP2022/021616, filed on May 26, 2022.

(30) Foreign Application Priority Data

Jun. 30, 2021  (JP) ................. 2021-109389

(51) Int. Cl.
*B25J 9/16*  (2006.01)
*B25J 9/00*  (2006.01)

(52) U.S. Cl.
CPC ........... *B25J 9/1661* (2013.01); *B25J 9/0084* (2013.01)

(58) Field of Classification Search
CPC ...... B25J 9/0084; B25J 9/1661; B25J 9/1674; G05B 2219/40113
See application file for complete search history.

(56) References Cited

U.S. PATENT DOCUMENTS

2008/0114492 A1*  5/2008  Miegel ................. B25J 9/1664
                                                         901/6
2010/0204828 A1*  8/2010  Yoshizawa ........... B25J 9/1666
                                                         700/245

(Continued)

FOREIGN PATENT DOCUMENTS

JP    H7-210223    8/1995
JP    H8-202429    8/1996

(Continued)

OTHER PUBLICATIONS

International Search Report dated Aug. 9, 2022 for PCT/JP2022/021616.

(Continued)

*Primary Examiner* — Dalena Tran
(74) *Attorney, Agent, or Firm* — SHIPWAY IP

(57) ABSTRACT

A robot automation system includes circuitry configured to generate a plurality of task patterns that are candidates of a task flow for performing a job including a plurality of tasks by at least one robot. Each of the plurality of task patterns includes a corresponding relationship between the plurality of tasks and the at least one robot. The circuitry is further configured to calculate an estimated cycle time of the job based on a simulation in which the at least one robot performs the plurality of tasks, for each of the plurality of task patterns. The circuitry is further configured to generate, as an operation program, at least one task flow for performing the job by the at least one robot, in response to comparing a preset reference cycle time for the job with the estimated cycle time for each of the plurality of task patterns.

17 Claims, 9 Drawing Sheets

(56) References Cited

U.S. PATENT DOCUMENTS

| | | | |
|---|---|---|---|
| 2012/0215351 A1* | 8/2012 | McGee | B25J 9/1676 |
| | | | 700/248 |
| 2013/0151214 A1 | 6/2013 | Ryou | |
| 2015/0239121 A1* | 8/2015 | Takeda | G06N 7/00 |
| | | | 700/250 |
| 2019/0314989 A1 | 10/2019 | Sokabe et al. | |
| 2020/0306967 A1 | 10/2020 | Takahashi et al. | |
| 2022/0281111 A1 | 9/2022 | Takahashi et al. | |

FOREIGN PATENT DOCUMENTS

| | | |
|---|---|---|
| JP | 2006-031122 | 2/2006 |
| JP | 4103057 | 6/2008 |
| JP | 2013-144349 | 7/2013 |
| JP | 2020-168666 | 10/2020 |
| JP | 2021-084174 | 6/2021 |
| WO | 2018/143003 | 8/2018 |

OTHER PUBLICATIONS

International Preliminary Report on Patentability with Written Opinion dated Jan. 11, 2024 for PCT/JP2022/021616.
Office Action issued in Japanese Patent Application No. P2023-531713 dated Apr. 23, 2024 (with English partial translation).

* cited by examiner

ROBOT AUTOMATION SYSTEM

CROSS-REFERENCE TO RELATED APPLICATIONS

This application is a continuation application of PCT Application No. PCT/JP2022/021616, filed on May 26, 2022, which claims the benefit of priority from Japanese Patent Application No. 2021-109389, filed on Jun. 30, 2021. The entire contents of the above listed PCT and priority applications are incorporated herein by reference.

BACKGROUND

Field

An aspect of the present disclosure relates to a planning system (or robot automation system), a robot system, a planning method, and a planning program.

Description of the Related Art

PCT International Publication No. WO2018/143003 describes a robot path generation device that generates a path of a robot between a start point and an end point arbitrarily set, based on a result of a machine learning process based on a data set.

SUMMARY

A robot automation system according to an aspect of the present disclosure includes circuitry configured to: generate a plurality of task patterns that are candidates of a task flow for performing a job including a plurality of tasks by at least one robot, wherein each of the plurality of task patterns includes a corresponding relationship between the plurality of tasks and the at least one robot; calculate an estimated cycle time of the job based on a simulation in which the at least one robot performs the plurality of tasks, for each of the plurality of task patterns; compare the estimated cycle time for each of the plurality of task patterns with a preset reference cycle time for the job; and generate, as an operation program, at least one task flow for performing the job by the at least one robot, in response to comparing the preset reference cycle time for the job with the estimated cycle time for each of the plurality of task patterns.

A processor-executable method according to an aspect of the present disclosure includes: generating a plurality of task patterns that are candidates of a task flow for performing a job including a plurality of tasks by at least one robot, wherein each of the plurality of task patterns includes a corresponding relationship between the plurality of tasks and the at least one robot; calculating an estimated cycle time of the job based on a simulation in which the at least one robot performs the plurality of tasks, for each of the plurality of task patterns; comparing the estimated cycle time for each of the plurality of task patterns with a preset reference cycle time for the job; and generating, as an operation program, at least one task flow for performing the job by the at least one robot, in response to comparing the preset reference cycle time for the job with the estimated cycle time for each of the plurality of task patterns.

A non-transitory computer-readable storage medium according to an aspect of the present disclosure stores processor-executable instructions to: generate a plurality of task patterns that are candidates of a task flow for performing a job including a plurality of tasks by at least one robot, wherein each of the plurality of task patterns includes a corresponding relationship between the plurality of tasks and the at least one robot; calculate an estimated cycle time of the job based on a simulation in which the at least one robot performs the plurality of tasks, for each of the plurality of task patterns; compare the estimated cycle time for each of the plurality of task patterns with a preset reference cycle time for the job; and generate, as an operation program, at least one task flow for performing the job by the at least one robot, in response to comparing the preset reference cycle time for the job with the estimated cycle time for each of the plurality of task patterns.

DETAILED DESCRIPTION

In the following description, with reference to the drawings, the same reference numbers are assigned to the same components or to similar components having the same function, and overlapping description is omitted.

Robot System

Figure 1:
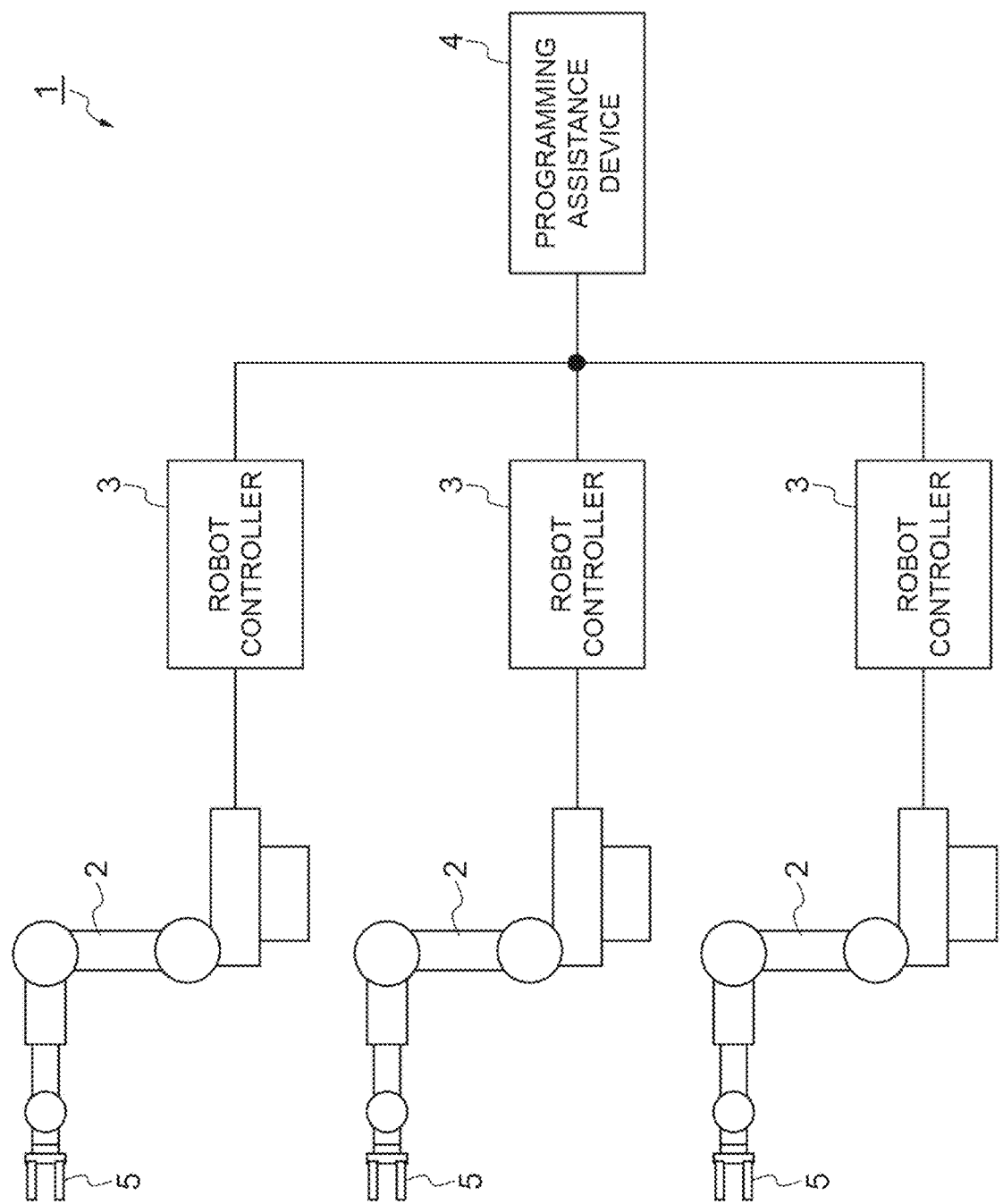
FIG. 1 is a diagram showing an example configuration of a robot system.

In some examples, the planning system or robot automation system according to the present disclosure is applied to a programming assistance device 4 of a robot system 1. In the present disclosure, the planning system or robot automation system refers to a computer system for determining an operation of at least one robot. The robot system 1 is a system that automates various works such as machining and assembly by causing a robot to perform an operation taught by an operator. FIG. 1 is a diagram showing an example configuration of the robot system 1. In some examples, the robot system 1 includes one or more robots 2, one or more robot controllers 3 corresponding to the one or more robots 2, and the programming assistance device 4. FIG. 1 shows three robot 2 and three robot controller 3, and shows a configuration in which one robot 2 is connected to one robot controller 3. However, the number of devices and the connection method are not limited to the example of FIG. 1. For example, a plurality of robots 2 may be connected to one robot controller 3.

In some examples, the robot 2 is a vertical articulated robot of a multi-axis serial link type, and may perform various processes in a state of holding a tool on a tip portion 5. The tool is also referred to as an end effector. The robot 2 may freely change the position and posture of the tip portion 5 within a predetermined range. The robot 2 may be a six-axis vertical articulated robot, or a seven-axis vertical articulated robot in which one redundant axis is added to six axes. In some examples, the plurality of the robot 2 are arranged such that the same process may be performed by any robot 2 on a certain workpiece.

The robot controller 3 is a device that controls the robot 2 according to a pre-generated operation program. In some examples, the operation program includes data for controlling the robot 2, for example, a path indicating a trajectory of the robot 2. The trajectory of the robot 2 refers to a path of motion of the robot 2 or a component thereof. For example, the trajectory of the robot 2 may be a trajectory of the tip portion 5. In some examples, the robot controller 3 calculates a joint angle target value (an angle target value of each joint of the robot 2) for matching the position and posture of the tip portion 5 to a target value indicated by the operation program, and controls the robot 2 according to the angle target value.

Under the control of the robot controller 3, at least one robot 2 performs a series of processes. In the present disclosure, the series of processes is also referred to as a job. At least one robot 2 performs the job, and a result desired by a user of the robot system 1 is obtained. The smallest unit of processing that constitutes the job is referred to as a task. The job therefore includes one or more tasks. Each robot 2 may perform various tasks, such as "taking a component", "placing a component", "fitting a component into a workpiece", "taking a standby posture", etc. The task may include a path that is the trajectory of the robot 2 in the task.

In some examples, the robot 2 may be a movable robot. In this case, the robot 2 may move in a workspace to a given position in accordance with the operation program prior to the start of processing. For example, the robot 2 may move by itself while avoiding other objects. The robot 2 may repeatedly perform the job indicated by the operation program, i.e., at least one task, in an arrangement indicated by the operation program.

The programming assistance device 4 is a device that generates the operation program. For example, the programming assistance device 4 may generate, for each of the one or more robots 2, the operation program indicating an operation to be performed by the robot 2. In some examples, the programming assistance device 4 evaluates at least part of the job, such as a path, and a posture of the robot 2 at a certain time point. The programming assistance device 4 then generates the operation program based on a result of the evaluation. The programming assistance device 4 may execute a simulation to perform the evaluation. The simulation refers to a process of virtually executing at least part of the operation program. In some examples, the simulation refers to executing at least part of the operation program on a computer without actually operating the robot 2. In some examples, the simulation is a process of virtually executing at least part of the operation program on a virtual space in which the robot 2 and other objects are located. The other object is an object placed around the robot 2, and may be, for example, another robot 2, a workpiece, or another manufacturing device. In some examples, at least one robot 2 performs a plurality of tasks in the simulation.

Task Flow

In some examples, the programming assistance device 4 generates a task flow for efficiently performing the job and generates the operation program for causing the one or more robots 2 to perform the task flow. In the present disclosure, the task flow refers to information indicating which robot performs which task in which order and at which timing. Each task flow is information for causing at least one robot 2 to perform the job.

In some examples, the task flow includes a plurality of work tasks, a plurality of connection tasks, and a plurality of wait tasks. The work task refers to a task defined in advance by the user. The connection task refers to a task for guiding the robot 2 to a next work task, and is positioned between adjacent two work tasks. The wait task refers to a task for causing the robot to wait. The wait task may be positioned between the work task and the connection task. The connection task and wait task are automatically set or inserted by the programming assistance device 4.

In the present disclosure, a path in the work task is referred to as a "work path", and a path in the connection task is referred to as an "air-cut path". The work path is predefined by the user when generating the work task. The air-cut path connects the end point of the work path in a preceding work task and the start point of the work path in a subsequent work task. In some examples, the air-cut path is automatically set by, for example, setting at least one teaching point other than the start point and the end point. The teaching point refers to a reference point that is set to define a path. Since the robot 2 does not move in the wait task, the wait task does not have a path.

The task flow may include a waiting section that is a duration during which the robot 2 temporarily stops. That is, the robot 2 does not perform any task during the waiting section. The waiting section may be set by inserting the wait task, or may be set in the simulation by a factor different from the wait task. For example, the waiting section may be set based on a constraint related to an operation of the robot 2 or on an external factor such as an environment around the robot 2.

Figure 2:
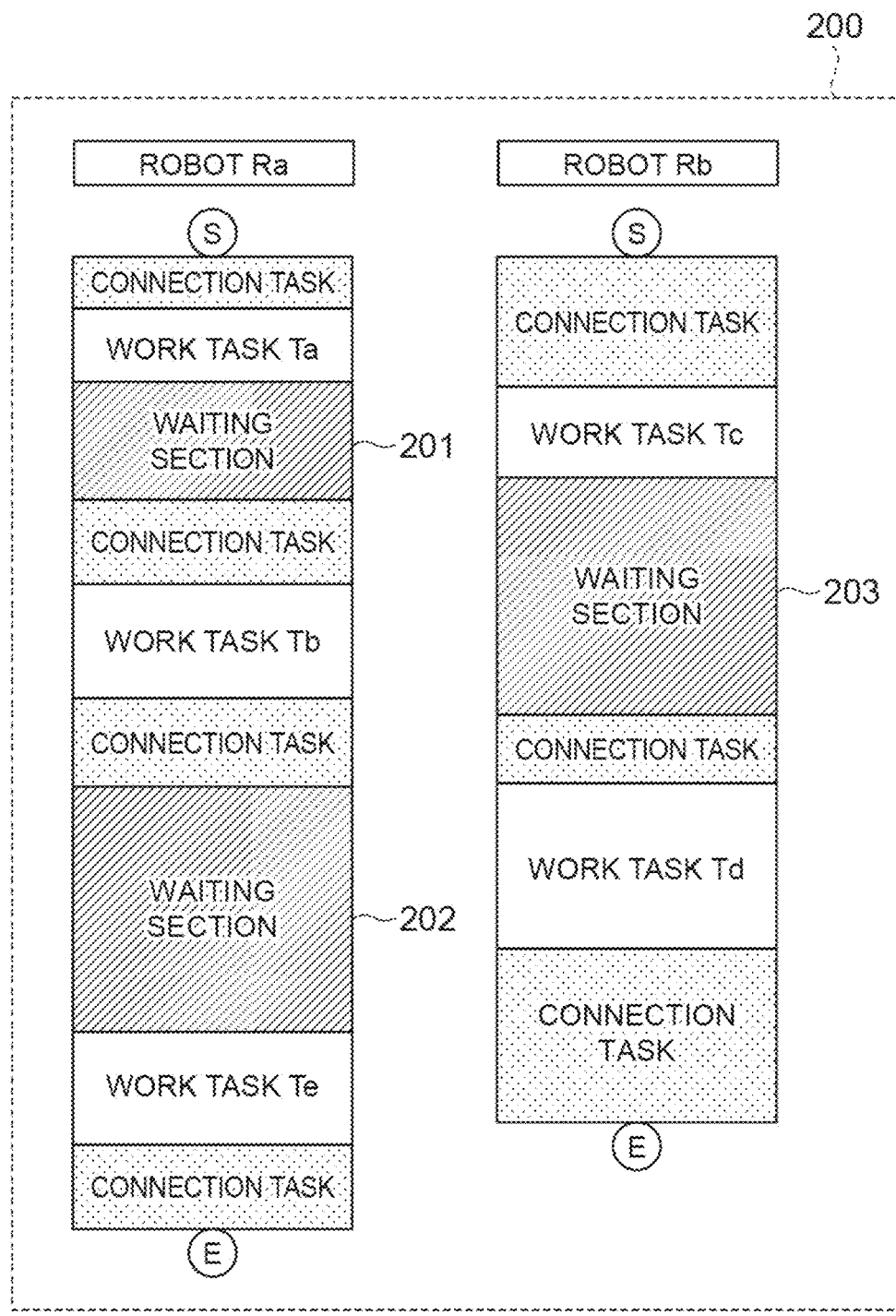
FIG. 2 is a diagram showing an example task flow.

FIG. 2 is a diagram showing an example task flow. A task flow 200 in this example indicates that two robots 2 (robots Ra and Rb) cooperatively perform a job including five work tasks Ta, Tb, Tc, Td and Te. In FIG. 2, the symbol "S" indicates a start posture (initial posture) of the robot 2 and the symbol "E" indicates an end posture of the robot 2. In this example, the robot Ra performs the work tasks Ta, Tb and Te in this order, and the robot Rb performs the work tasks Tc and Td in this order. The connection task is inserted between a preceding work task and a subsequent work task, and as a result, is positioned between the adjacent two work tasks. As shown in FIG. 2, in some examples, the connection task is also inserted between the start posture and the first work task, and is further inserted between the last work task and the end posture. The task flow 200 includes waiting sections 201, 202 and 203. Each waiting section is positioned between two consecutive tasks (for example, between a consecutive work task and a connection task).

The programming assistance device 4 receives an input regarding at least one work task. The programming assistance device 4 then executes a simulation based on various constraints such as an execution order of work tasks, allocation of the robot 2 to individual work tasks, and interlock which is a mechanism for executing a next operation only when a given condition is satisfied. The programming assistance device 4 then generates the task flow based on the simulation.

In some examples, the programming assistance device 4 generates at least one task flow based on a reference cycle time preset for the job and an estimated cycle time of the job estimated based on the simulation. The cycle time refers to a time for the at least one robot 2 to perform the job once, that is, an allocated time of the job. In some examples, the reference cycle time is designated by the user and is therefore an execution time of the job desired by the user. The estimated cycle time refers to an execution time of the job calculated by the simulation. In some examples, the programming assistance device 4 generates respective task flows such that the estimated cycle time is less than or equal to the reference cycle time.

In some examples, the programming assistance device 4 reduces at least one waiting time included in the job to increase an operating rate of at least one robot 2 in the job. This process is intended, for example, to operate each robot 2 for as much time as possible during the cycle time. In some examples, for at least one task flow, the programming assistance device 4 increases the allocated time of at least one task of the plurality of tasks constituting the task flow, thereby decreasing the waiting time. A task for which the programming assistance device 4 increases the allocated time is the work task or the connection task. In the example of FIG. 2, the programming assistance device 4 attempts to shorten at least one of the waiting sections 201, 202 and 203. In a case of increasing the allocated time of at least one work task or connection task, the programming assistance device 4 may increase the estimated cycle time as long as the estimated cycle time is less than or equal to the reference cycle time. In some examples, the programming assistance device 4 increases the estimated cycle time while decreasing at least one waiting time, such that the estimated cycle time is close to the reference cycle time.

Programming Assistance Device

Figure 3:
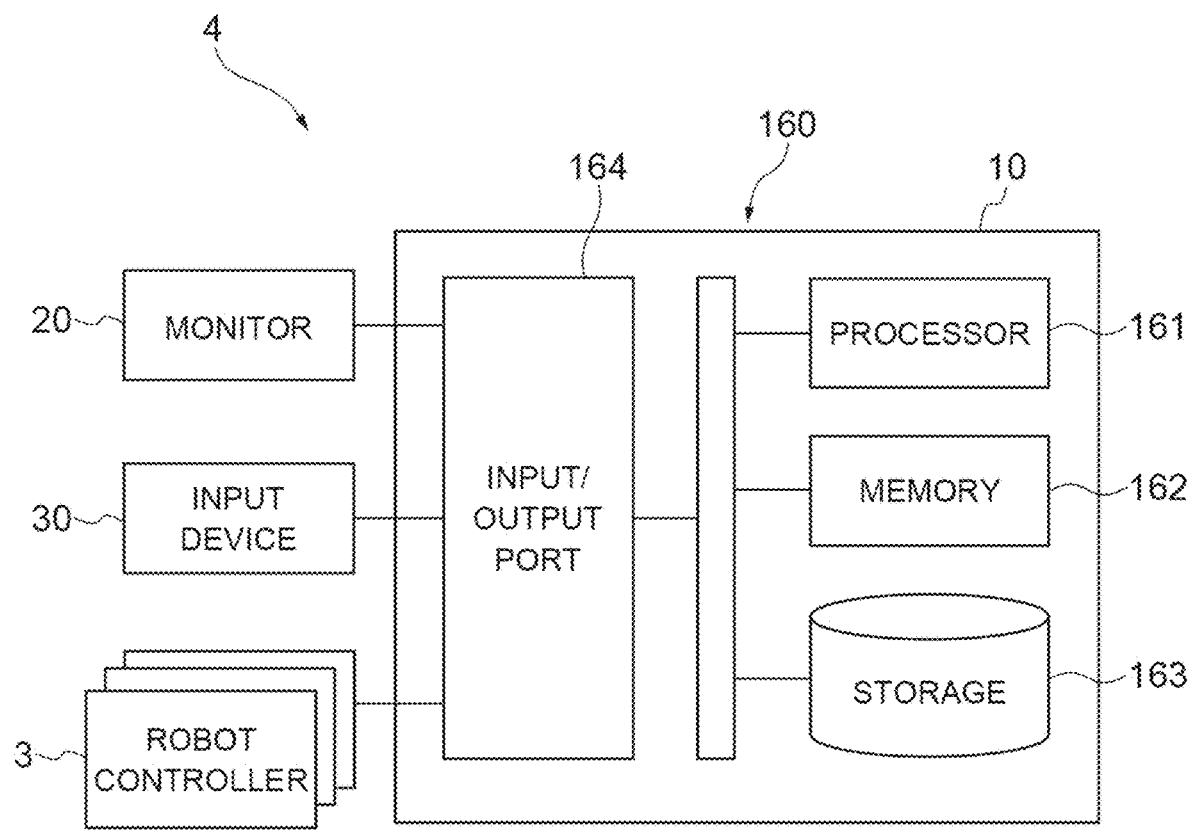
FIG. 3 is a diagram showing an example hardware configuration of a programming assistance device.

FIG. 3 is a diagram showing an example hardware configuration of the programming assistance device 4. In some examples, the programming assistance device 4 comprises a main body 10, a monitor 20, and an input device 30.

The main body 10 is constituted by at least one computer. The main body 10 has circuitry 160 and the circuitry 160 has at least one processor 161, a memory 162, a storage 163, and an input/output port 164. The storage 163 stores a program for configuring each functional module of the main body 10. The storage 163 is a computer-readable storage medium such as a hard disk, a nonvolatile semiconductor memory, a magnetic disk, or an optical disc. The memory 162 temporarily stores the program loaded from the storage 163, a calculation result of the processor 161, etc. The processor 161 configures each functional module by executing the program in cooperation with the memory 162. The input/output port 164 inputs and outputs electrical signals among the monitor 20, the input device 30, and the robot controller 3 in response to commands from the processor 161.

The monitor 20 is a device for displaying information output from the main body 10. The monitor 20 may be any one as long as graphic display is possible, and examples thereof include a liquid crystal panel. The input device 30 is a device for inputting information to the main body 10. The input device 30 may be any one as long as desired information may be input, and examples thereof include a keypad and a mouse.

The monitor 20 and the input device 30 may be integrated as a touch panel. The main body 10, the monitor 20, and the input device 30 may be integrated, such as a tablet computer.

Figure 4:
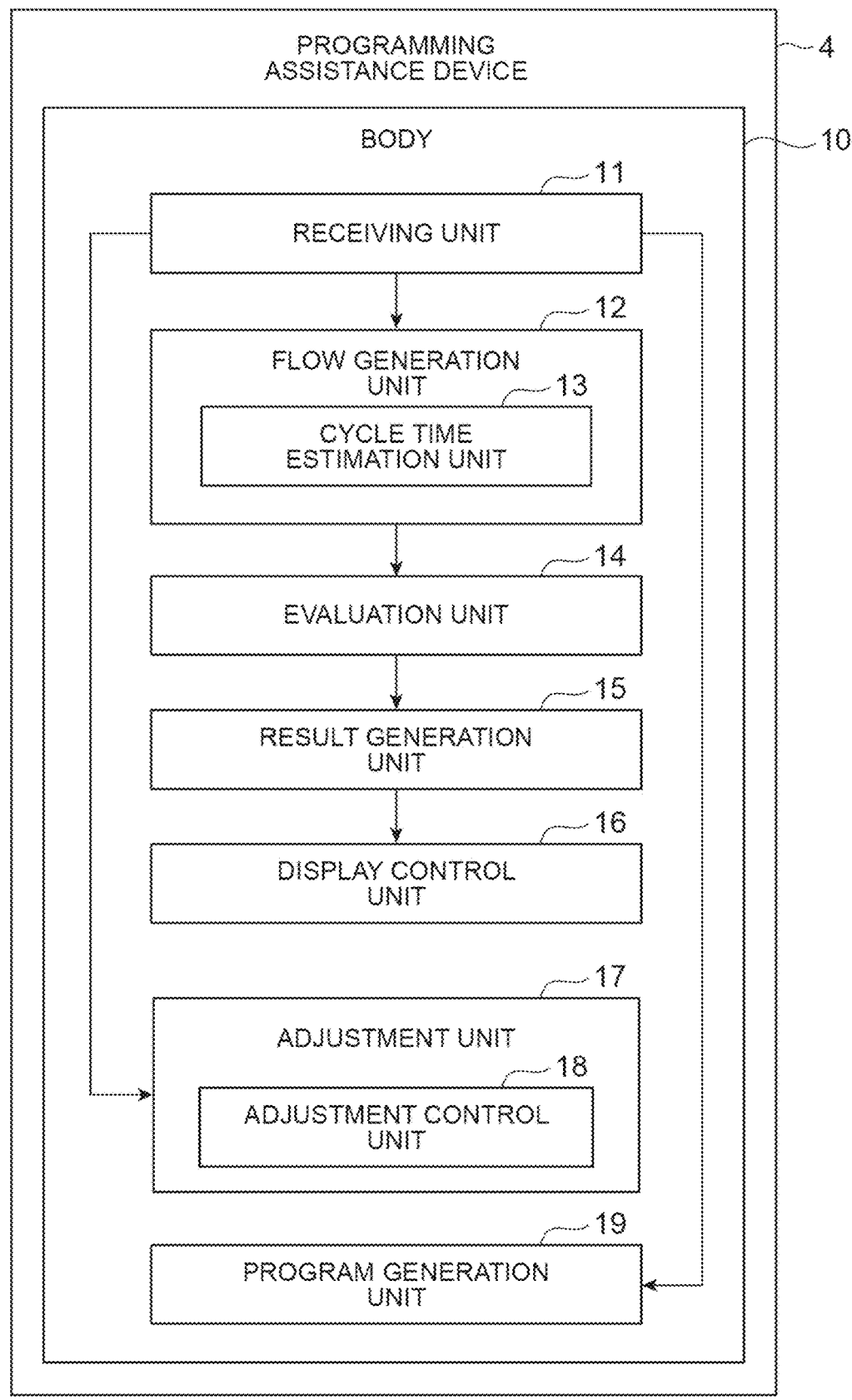
FIG. 4 is a diagram showing an example functional configuration of the programming assistance device.

FIG. 4 is a diagram showing an example functional configuration of the programming assistance device 4. In some examples, the programming assistance device 4 comprises a receiving unit 11, a flow generation unit 12, a cycle time estimation unit 13, an evaluation unit 14, a result generation unit 15, a display control unit 16, an adjustment unit 17, an adjustment control unit 18, and a program generation unit 19 as functional modules. The receiving unit 11 is a functional module that receives data for generating the task flow or the operation program. The flow generation unit 12 is a functional module that generates at least one task flow. The cycle time estimation unit 13 is a functional module that calculates the estimated cycle time of the job based on the simulation. In some examples, the cycle time estimation unit 13 is implemented as part of the flow generation unit 12. The evaluation unit 14 is a functional module that calculates the evaluation value related to at least one robot 2 that performs the task flow. The result generation unit 15 is a functional module that generates a planning result indicating the at least one task flow. In some examples, the planning result is information indicating an execution plan of the job or a possible operation program (i.e., a candidate of the operation program). The display control unit 16 is a functional module that displays the at least one task flow as the planning result (i.e., as the possible operation program) on a display device such as the monitor 20. The adjustment unit 17 is a functional module that increases the allocated time of the task constituting the task flow. That is, the adjustment unit 17 increases the allocated time for the at least one robot 2 to perform 11 the task. The adjustment control unit 18 is a functional module that determines whether the allocated time is able to be increased. In some examples, the adjustment control unit 18 is implemented as part of the adjustment unit 17. The program generation unit 19 is a functional module that generates at least one operation program for causing the one or more robots 2 to perform one task flow.

Planning Method

Figure 5:
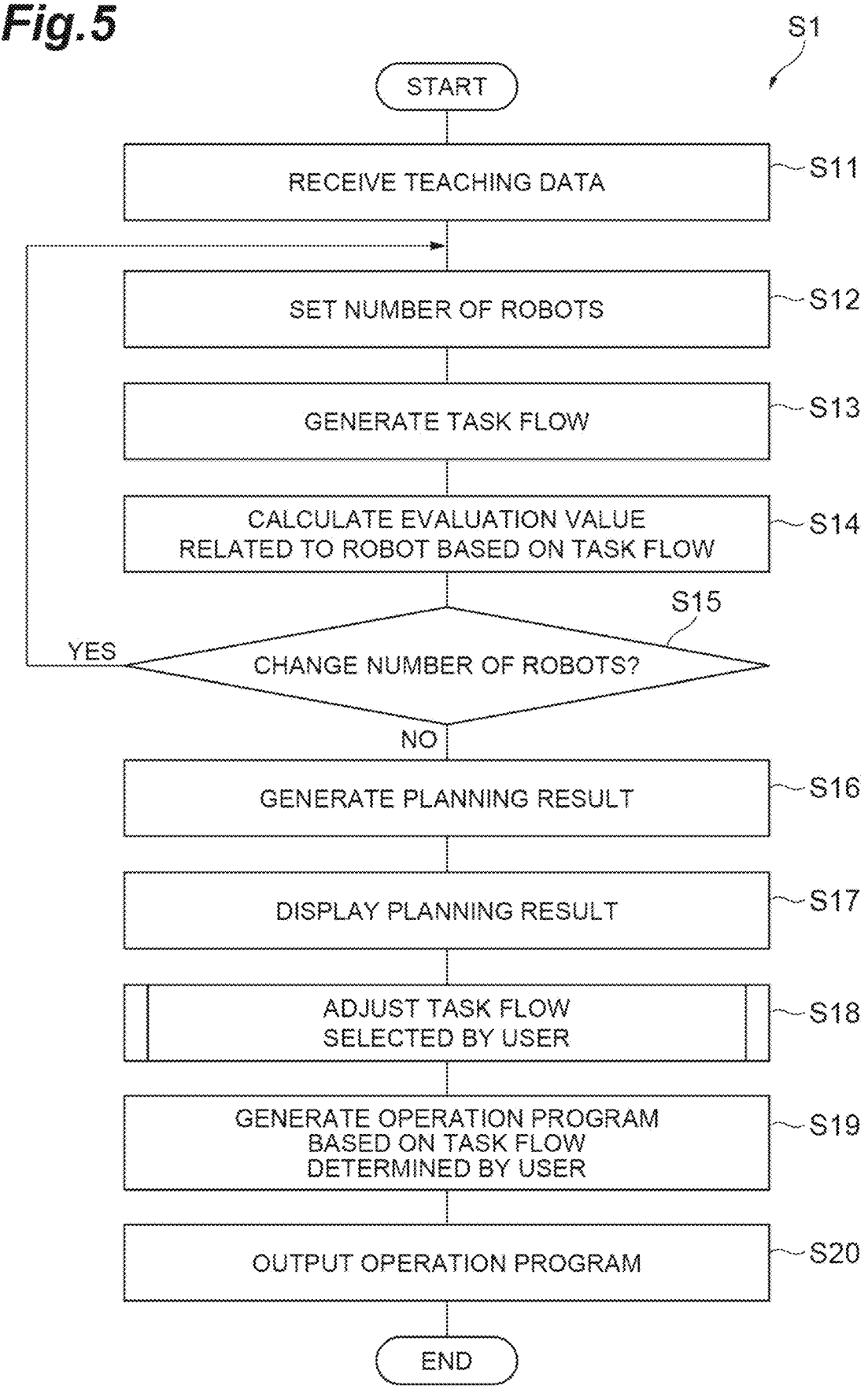
FIG. 5 is a flowchart showing an example of processing in the programming assistance device.

As an example of the planning method according to the present disclosure, an example of a series of processing procedures executed by the programming assistance device 4 will be described with reference to FIG. 5. FIG. 5 is a flowchart showing an example of the processing in the programming assistance device 4 as a processing flow Si. That is, the programming assistance device 4 performs the processing flow Si.

In step S11, the receiving unit 11 receives teaching data for generating a task flow. The teaching data is electronic data including information for causing at least one robot 2 to perform a job, and indicates, for example, one or more work tasks and constraints related to an operation of the robot 2. Examples of the constraints include arrangement of respective robots 2, an execution order of a plurality of work tasks, correspondence between the robot 2 and a work task, a posture of the robot 2 at each of start and end of the work task, a reference cycle time, an operation time of the robot 2 in each work task, and a concurrency constraint. The concurrency constraint is a kind of constraint or condition imposed when operating the robot 2. For example, the concurrency constraint indicates a timing at which a plurality of tasks may be performed in parallel by a plurality of the robots 2. The teaching data may include at least one of matters individually set for respective robots 2 and a matter commonly set for one or more robots 2. Various approaches may be used to obtain the teaching data. For example, the receiving unit 11 may receive the teaching data input by a user, may read the teaching data from a predetermined storage device based on the user input, or may receive the teaching data transmitted from another computer.

In step S12, the flow generation unit 12 sets the number of robots 2 that perform the job. In some examples, the flow generation unit 12 generates a plurality of task flows while changing the number of robots 2, and, as part of that generation, sets the number of robots 2 in step S12. For example, the flow generation unit 12 increases the number of robots 2 by one from 1 to a predetermined largest value, and generates the task flow for each of the numbers of robots 2.

In step S13, the flow generation unit 12 generates at least one task flow based on the teaching data and the set number of robots 2. In some examples, the flow generation unit 12 executes a simulation based on the teaching data and the number of robots 2, sets a connection task and a wait task for the predetermined work task, and further sets an air-cut path. The flow generation unit 12 executes an interference check in the simulation and generates a task flow in which no interference is detected. The interference refers to contact or collision between objects, for example, contact or collision of the robot 2 with another object that has not been expected. In some examples, the flow generation unit 12 generates a task flow in which the estimated cycle time is less than or equal to the reference cycle time.

In some examples, the flow generation unit 12 generates a plurality of task patterns that are candidates for the finally generated task flow, based on the teaching data. The task pattern refers to information indicating a job execution method that may be adopted as the task flow. For example, each task pattern indicates a possible combination of a corresponding relationship between the robot 2 and a task and an execution order of the task. The flow generation unit 12 executes the simulation based on teaching data for each task pattern, and identifies a task pattern in which no interference is detected.

For example, the flow generation unit 12 may identify a task pattern in which the interference is not detected, by the simulation including calculation of the traveling salesman problem. The traveling salesman problem is an optimization problem that calculates, given a set of nodes (cities) and a movement cost between respective nodes, a movement path with the smallest total movement cost among a plurality of movement paths in which an agent (salesman) goes around all nodes exactly once. In some examples, the flow generation unit 12 identifies one task pattern by solving the traveling salesman problem based on the concurrency constraints of each of the plurality of task patterns. The traveling salesman problem based on the concurrency constraints is a process of assuming a plurality of robots 2 as agents, and searching a solution (movements of respective agents) having the smallest total movement cost while moving the plurality of agents along a time axis under the concurrency constraints. The traveling salesman problem represents a wait task of each of the plurality of robots 2 by a node and represents each of a work task and a connection task by a branch.

The flow generation unit 12 automatically generates an air-cut path in the connection task. In some examples, the flow generation unit 12 generates respective air-cut paths so as to avoid interference of the robot 2 with other objects. For example, in order to generate a certain air-cut path, the flow generation unit 12 generates one or more via points to avoid interference between the robot 2 and other objects, between the end point of the work path in a preceding work task and the start point of the work path in a subsequent work task. The flow generation unit 12 then generates the air-cut path to pass through the via points in order. In order to generate one air-cut path, the flow generation unit 12 may repeatedly execute a series of processes including setting of the via point and confirmation of avoidance of interference. Details of such a generation method are described in, for example, Japanese Patent No. 4103057.

In the simulation, for each task pattern, the cycle time estimation unit 13 calculates the allocated time of each task constituting the task pattern, and calculates the estimated cycle time based on these allocated times. The cycle time estimation unit 13 calculates the allocated time for each task assuming that the robot 2 operates at full speed. The flow generation unit 12 generates at least one task flow based on the reference cycle time and the estimated cycle time of each task pattern. In some examples, the flow generation unit 12 may compare the estimated cycle time for each of the plurality of task patterns with the reference cycle time, and generate, as the possible operation program, the at least one task flow in response to the comparison. For example, the flow generation unit 12 generates at least one task flow in which the estimated cycle time is less than or equal to the reference cycle time. The flow generation unit 12 may generate at least one task flow having a smallest difference between the estimated cycle time and the reference cycle time. In some examples, the flow generation unit 12 calculates a cycle time difference between the estimated cycle time for each of the plurality of task patterns and the reference cycle time, identifies a task pattern having a smallest cycle time difference among the plurality of task patterns, and generates the at least one task flow to include the identified task pattern having the smallest cycle time difference. The flow generation unit 12 may generate at least one task flow having a smallest estimated cycle time. In some examples, the flow generation unit 12 compares the estimated cycle time for each of the plurality of task patterns to identify a task pattern having a smallest estimated cycle time among the plurality of task patterns, and generates the at least one task flow to include the identified task pattern having the smallest estimated cycle time. In a case where the flow generation unit 12 generates a plurality of task flows, the estimated cycle time may be different between at least two task flows. That is, the plurality of task flows each include a task pattern for which a different estimated cycle time is calculated. Alternatively, the plurality of task flows may include at least two task flows having the same estimated cycle time.

In step S14, the evaluation unit 14 calculates, for each of the at least one task flow generated, an evaluation value related to the at least one robot 2 performing the task flow. In the present disclosure, the evaluation value refers to an index that directly or indirectly indicates the significance or value of the robot 2 that performs the job. The evaluation value may be used as a reference for the user to select one task flow from the at least one task flow generated. The evaluation unit 14 may calculate the evaluation value based on at least one of data obtained from the simulation by the flow generation unit 12 and a further calculation separate from the simulation. In a case where the task flow indicates operations of a plurality of robot 2, the evaluation unit 14 may calculate a statistical value of the evaluation values of the respective robots 2 as the final evaluation value in the task flow. The statistical value may be, for example, an average or a median. Alternatively, the evaluation unit 14 may obtain a set of evaluation values of the respective robots 2. For example, the evaluation unit 14 may calculate at least one of an operating rate, a product life, and a throughput as the evaluation value.

The operating rate refers to a ratio of the operation time of the robot 2 to the estimated cycle time. For example, the evaluation unit 14 calculates the operating rate for each robot 2 as follows. That is, the evaluation unit 14 calculates the sum of the allocated times of all work tasks and all connection tasks of the robot 2 in the task flow. The evaluation unit 14 then obtains the operating rate by dividing the total time by the estimated cycle time.

The product life refers to a period of time during which the robot 2 is able to operate in a manner that meets product specifications. For example, the evaluation unit 14 calculates the product life for each robot 2 as follows. That is, the evaluation unit 14 calculates the load applied to the joint axes of the at least one robot 2 in the task flow. The evaluation unit 14 may calculate the load based on the specifications of the robot 2 and the assumed motion of the robot 2 obtained by the simulation. The specifications of the robot 2 may include at least one of structure and operational specifications of the robot 2. The assumed motion of the robot 2 may include at least one of a change in posture, an operating speed, and a weight of a workpiece processed by the robot 2. The evaluation unit 14 calculates the product life of the robot 2 based on the load and the specifications of the robot 2. Based on the product life, the evaluation unit 14 may further calculate at least one of an introduction cost of the robot 2, an electricity charge incurred by the operation of the robot 2, and a break-even point, as an evaluation value.

The throughput refers to an amount of process of the robot 2 per unit time. The evaluation unit 14 may calculate the throughput based on the estimated cycle time and the unit time, and for example, may obtain the throughput by dividing the unit time by the estimated cycle time. Examples of the length of the unit time include one hour, one day, one week, one month, three months (quarterly), six months, and one year. In other examples, the unit time may be an estimated operating time per day.

In step S15, the flow generation unit 12 determines whether to change the number of robots 2. For example, the flow generation unit 12 increases the number of robots 2 by one, and changes the number of robots 2 to that value if the increased number does not exceed a predetermined value. In a case of changing the number of robots 2 (YES in step S15), the processing returns to step S12, and the processing of steps S12 to S14 is repeated. That is, the flow generation unit 12 sets the number of robots 2 to the changed value in step S12, generates the task flow based on the number of robots 2 in step S13, and calculates the evaluation value for the task flow in step S14. In a case of not changing the number of robots 2 (NO in step S15), the processing proceeds to step S16.

In step S16, the result generation unit 15 generates a planning result indicating at least one task flow generated. The result generation unit 15 temporarily or permanently stores the planning result in a storage unit. The storage unit may be the memory 162 or the storage 163.

In step S17, the display control unit 16 displays the planning result. For example, the display control unit 16 displays the planning result on the monitor 20.

Figure 6:
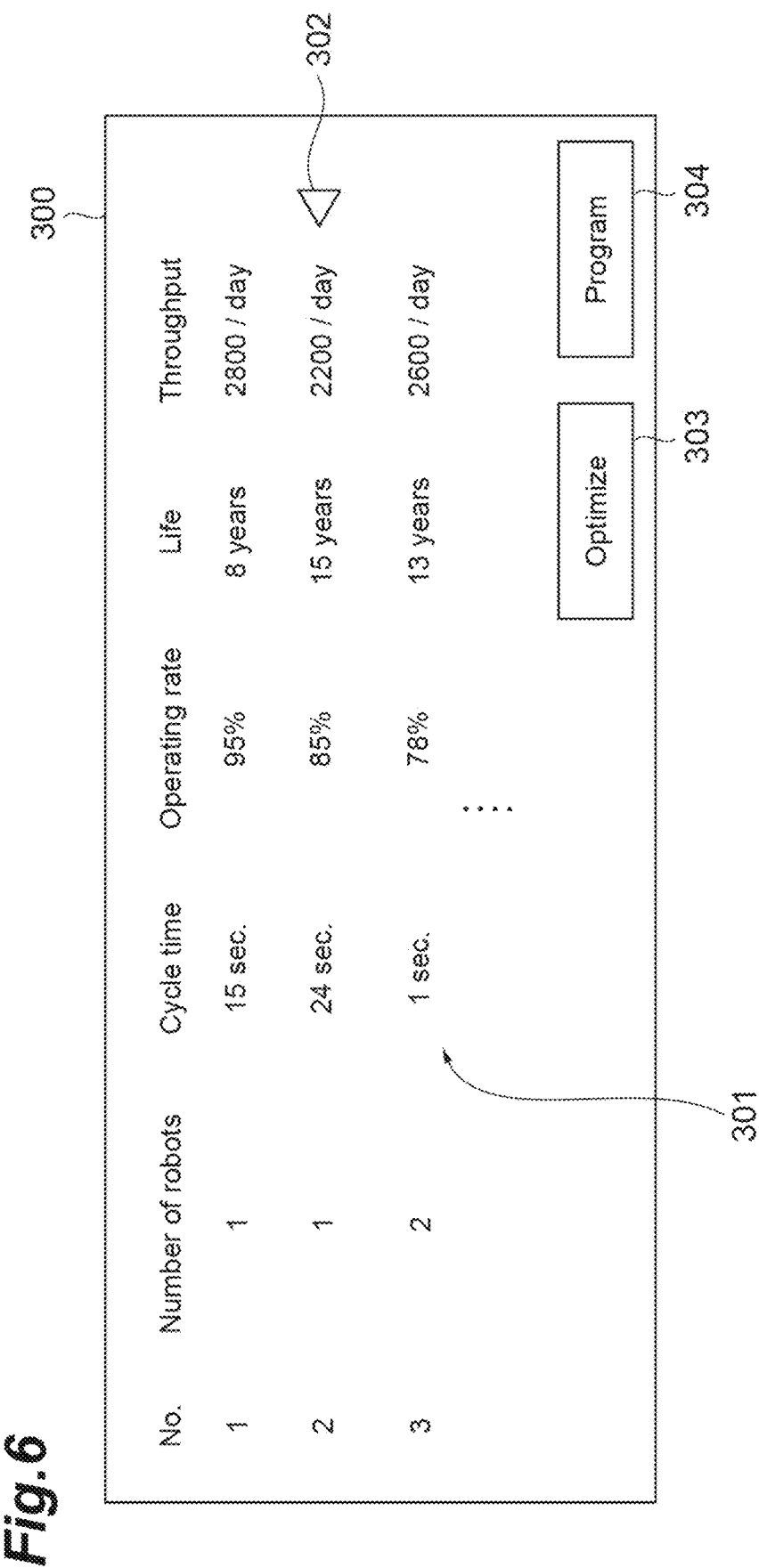
FIG. 6 is a diagram showing an example of displaying a planning result.

FIG. 6 is a diagram showing an example of displaying the planning result. In this example, the display control unit 16 displays a screen 300 representing the generated plurality of task flows in tabular form. The screen 300 includes a table 301 indicating respective task flows. Each row of the table 301 corresponds to one task flow. The table 301 has a number ("No." column) for identifying each task flow, the number of robots 2, an estimated cycle time, an operating rate, a product life, and a throughput as columns. The screen 300 further includes a cursor 302, an optimize button 303, and a program button 304. The cursor 302 is a user interface for selecting one task flow from the table 301. The optimize button 303 is a user interface for causing the programming assistance device 4 to adjust the selected task flow. The adjustment includes increasing the allocated time of at least one task (work task or connection task) of the plurality of tasks constituting the task flow, and may further include adjusting the estimated cycle time. The program button 304 is a user interface for causing the programming assistance device 4 to generate an operation program corresponding to the selected task flow.

Referring back to FIG. 5, in step S18, the adjustment unit 17 adjusts the task flow selected by the user. In some examples, in a case where the user clicks the optimize button 303, the receiving unit 11 receives a user input instructing the adjustment of the selected task flow. The adjustment unit 17 adjusts the task flow selected with the cursor 302 in response to the user input. In some examples, the adjustment unit 17 increases the allocated time of at least one task (work task or connection task) of a plurality of tasks constituting the task flow, thereby shortening a waiting time.

Figure 7:
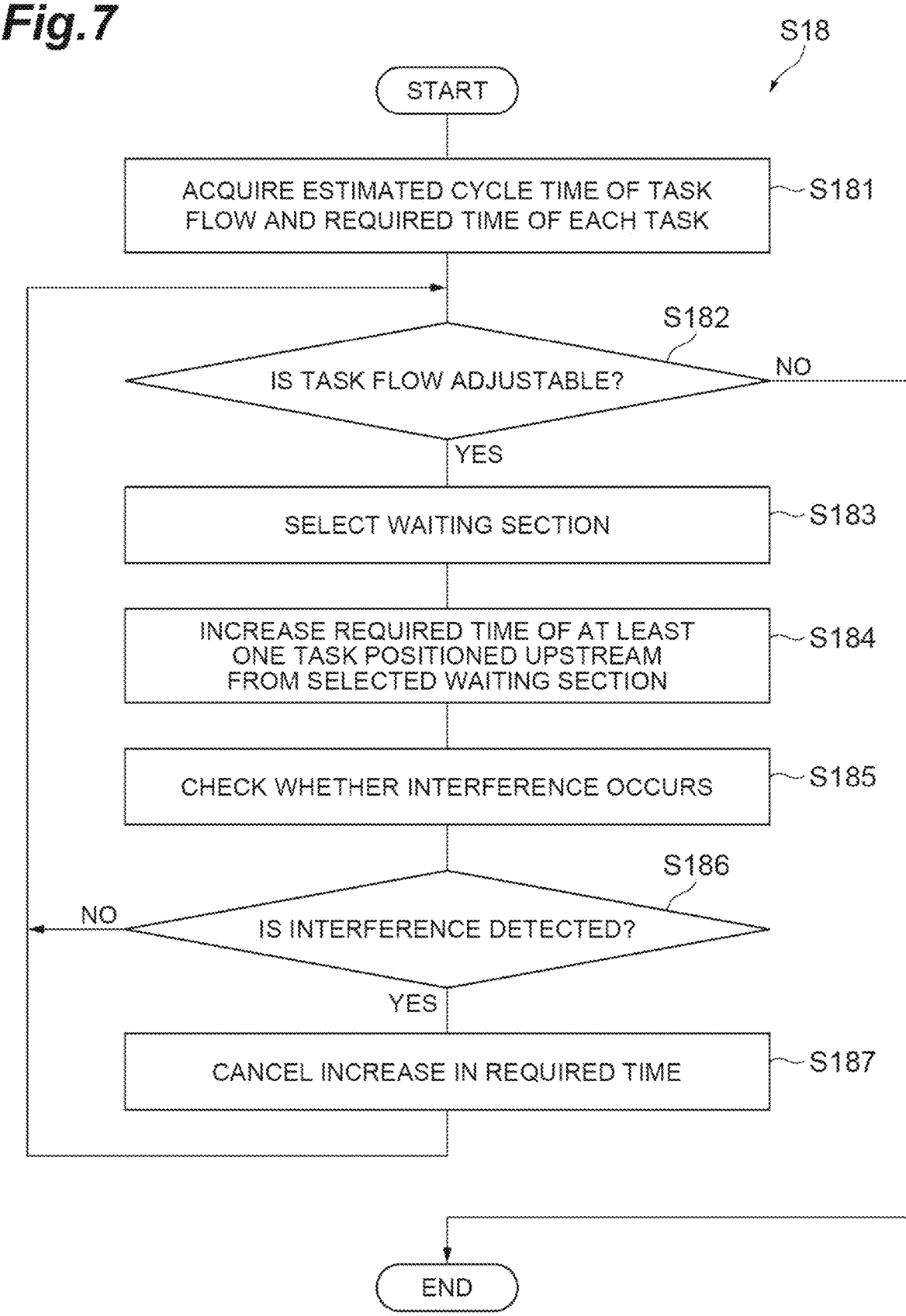
FIG. 7 is a flowchart showing an example of a detailed procedure of adjusting a task flow.

An example adjustment of the task flow will be described with reference to FIG. 7. FIG. 7 is a flowchart showing an example of a detailed procedure of the adjustment.

In step S181, the adjustment unit 17 acquires the estimated cycle time of the selected task flow and the allocated time of each task of the task flow. These data with respect to time have already been obtained by the simulation executed by the flow generation unit 12, and the adjustment unit 17 acquires the data.

In step S182, the adjustment control unit 18 determines whether the task flow is adjustable. In a case where the task flow indicates motions of a plurality of robots 2, the adjustment control unit 18 may determine whether the task flow may be adjusted while satisfying the concurrency constraints. In some examples, the adjustment control unit 18 determines whether the estimated cycle time may be increased such that the estimated cycle time does not exceed the reference cycle time. The adjustment control unit 18 determines that the task flow is able to be adjusted if the estimated cycle time is able to be increased, and otherwise determines that the task flow is unable to be adjusted. In other examples, the adjustment control unit 18 determines whether it is possible to increase the allocated time of at least one task (work task or connection task), regardless of whether to increase the estimated cycle time. The adjustment control unit 18 determines that the task flow is able to be adjusted if the allocated time is able to be increased, and otherwise determines that the task flow is unable to be adjusted.

In a case where the task flow is adjustable (YES in step S182), the processing proceeds to step S183. In step S183, the adjustment unit 17 selects one waiting section from the task flow. For example, the adjustment unit 17 selects the waiting section having the longest waiting time in the task flow.

In step S184, the adjustment unit 17 increases the allocated time of at least one task (work task or connection task) positioned upstream from the selected waiting section. The "task positioned upstream from the waiting section" refers to a task that is performed prior to the waiting section when the task flow (i.e., the job) is performed. For example, the adjustment unit 17 may increase the allocated time of the task positioned immediately before the selected waiting section. In the examples, the selected waiting section having the longest waiting time is located between that task and a downstream task as the two consecutively positioned tasks in the task flow. If the waiting section having the longest waiting time is selected, the adjustment unit 17 increases the allocated time of at least one task so as to shorten the longest waiting time. The adjustment unit 17 may increase the allocated time of at least one task to decrease the difference between the estimated cycle time of the task flow and the reference cycle time. In this process, the adjustment unit 17 extends the estimated cycle time while maintaining the estimated cycle time to be equal to or less than the reference cycle time. Alternatively, the adjustment unit 17 may increase the allocated time of at least one task so as not to change the difference between the estimated cycle time of the task flow and the reference cycle time.

The adjustment unit 17 may only increase the allocated time of a certain type of task. For example, the adjustment unit 17 may increase the allocated time of at least one connection task without changing the allocated time of each of the plurality of work tasks. That is, the allocated time of the task automatically inserted by the programming assistance device 4 is increased without affecting the task defined by the user. Alternatively, the adjustment unit 17 may increase the allocated time of at least one task (work task or connection task) for which an increase in the allocated time is possible. In some examples, each of the plurality of tasks has an adjustment possibility flag indicating whether or not an increase in the allocated time is possible. For example, each work task and each connection task have the adjustment possibility flag. The adjustment possibility flag may be preset by the user. The adjustment unit 17 refers to each adjustment possibility flag to identify a task whose allocated time is able to be increased, and increases the allocated time of the task.

In order to increase the allocated time of the task, the adjustment unit 17 may lower the operating speed of the robot 2 in the task than the current value, or may make the path of the robot 2 in the task longer than the current value. Alternatively, the adjustment unit 17 may execute both lowering the operating speed of the robot 2 and lengthening the path, for one task.

In step S185, the adjustment unit 17 checks whether interference occurs in the task flow in which the allocated time of at least one task (work task or connection task) is increased, that is, the adjusted task flow. For example, the adjustment unit 17 executes a simulation for the task flow to determine whether the interference occurs in at least one robot 2.

In a case where the interference is detected in the adjusted task flow (YES in step S186), the processing proceeds to step S187. In step S187, the adjustment unit 17 cancels the increase in allocated time executed in step S184. For example, the adjustment unit 17 executes the cancellation by discarding the adjusted task flow. After step S187, the processing returns to step S182. In this case, the adjustment control unit 18 executes the process of step S182 again on the task flow before being adjusted. The adjustment control unit 18 further takes the cancellation process in step S187 in consideration to determine whether the task flow is adjustable.

In a case where no interference is detected in the adjusted task flow (NO in step S186), the processing returns to step S182. In this case, the adjustment control unit 18 executes the process of step S182 on the adjusted task flow. That is, in a case where it is possible to further increase the allocated time of at least one task (work task or connection task) of the plurality of tasks, the adjustment control unit 18 causes the adjustment unit 17 to increase the allocated time of the at least one task.

In a case where the task flow is not adjustable (NO in step S182), the adjustment unit 17 terminates the process of step S18.

Figure 8:
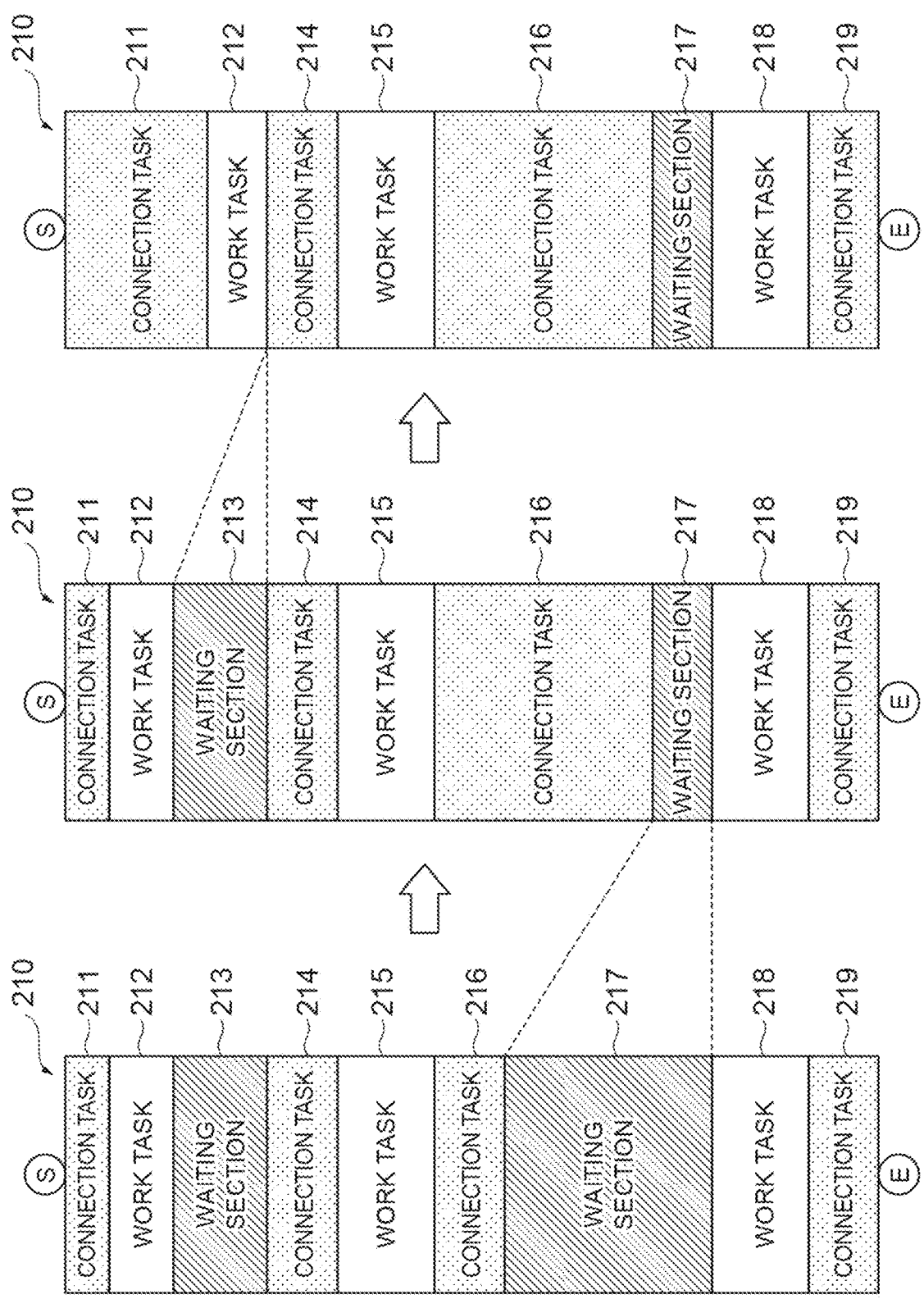
FIG. 8 is a diagram showing an example of processing for increasing an allocated time of a task.

An example adjustment of the task flow will be described with reference to FIG. 8. FIG. 8 is a diagram showing an example of processing for increasing the allocated time of a task of a task flow 210. The task flow 210 indicates an operation of one robot 2. The symbol "S" indicates a start posture of the robot 2, and the symbol "E" indicates an end posture of the robot 2. From the start posture to the end posture, the task flow 210 includes a connection task 211, a work task 212, a waiting section 213, a connection task 214, a work task 215, a connection task 216, a waiting section 217, a work task 218, and a connection task 219 in this order.

In some examples, the adjustment unit 17 selects the waiting section 217 with the longest waiting time in the task flow 210 (step S183). The adjustment unit 17 then increases the allocated time of at least one task (work task or connection task) positioned upstream from the waiting section 217. For example, the adjustment unit 17 increases the allocated time of at least one of the connection task 211, the work task 212, the connection task 214, the work task 215, and the connection task 216 (step S184). In the example of FIG. 8, the adjustment unit 17 increases the allocated time of the connection task 216 positioned immediately before the waiting section 217 so as to shorten the waiting section 217.

In a case where no interference is detected in the task flow 210 even when the allocated time of the connection task 216 is increased, and the task flow 210 is further adjustable, the adjustment unit 17 selects the waiting section 213 with the longest waiting time in the task flow 210 (step S183). The adjustment unit 17 then increases the allocated time of at least one task (work task or connection task) positioned upstream from the waiting section 213. For example, the adjustment unit 17 increases the allocated time of at least one of the connection task 211 and the work task 212 (step S184). In the example of FIG. 8, the adjustment unit 17 increases the allocated time of the connection task 211 to shorten the waiting section 213. In this example, the waiting section 213 is eliminated as a result, and the connection task 214 is performed immediately after the work task 212.

In a case where no interference is detected in the task flow 210 even when the allocated time of the connection task 211 is increased, and the task flow 210 is further adjustable, the adjustment unit 17 may further execute a process of increasing the allocated time of the task. For example, the adjustment unit 17 selects the waiting section 217 with the longest waiting time in the task flow 210 (step S183). The adjustment unit 17 may then increase the allocated time of at least one of the connection task 211, the work task 212, the connection task 214, the work task 215, and the connection task 216 (step S184).

In the example of FIG. 8, the adjustment unit 17 may increase the estimated cycle time of the job implemented by the task flow 210, by increasing the allocated time for at least one of the connected tasks 211 and 216. Alternatively, the adjustment unit 17 may increase the allocated time for at least one of the connection tasks 211 and 216 without changing the estimated cycle time.

Referring back to FIG. 5, in step S19, the program generation unit 19 generates an operation program based on the task flow determined by the user. In some examples, in a case where the user clicks on the program button 304, the receiving unit 11 receives a user input instructing the generation of the operation program corresponding to the selected task flow. In response to the user input, the program generation unit 19 generates the operation program for causing one or more robots 2 to perform the task flow selected with the cursor 302. In some examples, based on the task flow, the program generation unit 19 sets an execution order of respective work tasks, an allocation of a plurality of work tasks to one or more robots 2 (i.e., a corresponding relationship between the robot 2 and the work task), each connection task in which an air-cut path and a connection time are automatically set, and a waiting time of the robot between the work task and the connection task. Based on the setting, the program generation unit 19 generates at least one operation program for operating one or more robots 2. In some examples, the program generation unit 19 generates, for each of a plurality of the robot 2, the operation program that is specific to the robot 2.

In step S20, the program generation unit 19 outputs the generated operation program. For example, the program generation unit 19 may store the operation program in a storage unit such as the storage 163 or may transmit the operation program to another computer such as the robot controller 3. Alternatively, the program generation unit 19 may display the operation program on the monitor 20 in the form of text, a moving or still image by computer graphics (CG), etc. The programming assistance device 4 may execute additional processing such as further interference checking, on the output operation program. In some examples, the program generation unit 19 outputs at least one operation program to at least one robot controller 3, and each robot controller 3 operates one or more robots 2 based on the operation program.

Figure 9:
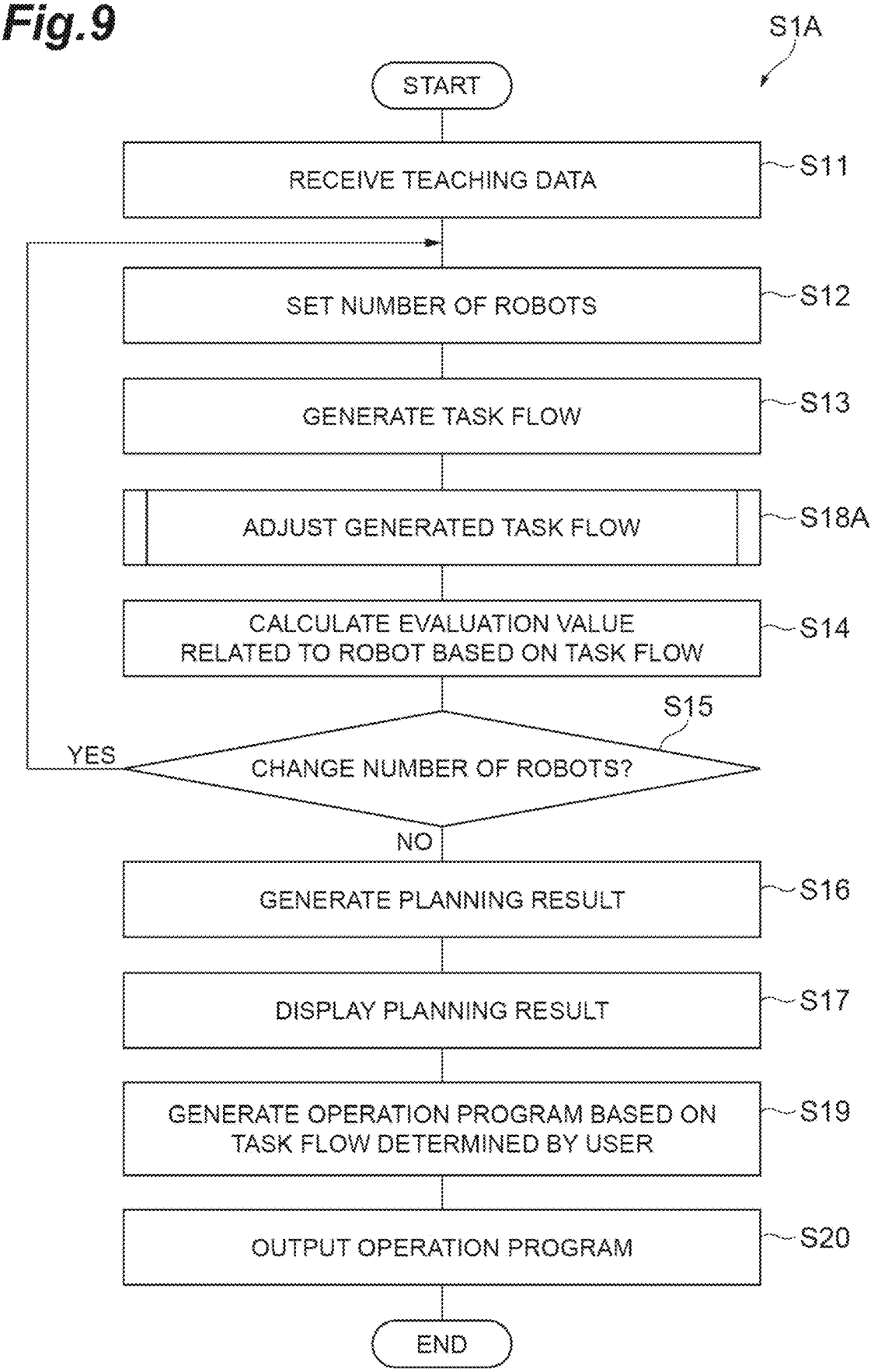
FIG. 9 is a flowchart showing another example of processing in the programming assistance device.

In the processing flow Si, the adjustment unit 17 adjusts the task flow selected by the user. In other examples, the adjustment unit 17 may automatically adjust the task flow without receiving the user input. Another example of the automatic adjustment will be described with reference to FIG. 9. FIG. 9 is a flowchart showing another example of the process in the programming assistance device 4 as a processing flow S1A. That is, the programming assistance device 4 executes the processing flow S1A.

The processing flow S1A differs from the processing flow Si in that it does not contain step S18 and instead contains step S18A. Steps S11 to S13 are the same as the processing flow Si. In the subsequent step S18A, the adjustment unit 17 adjusts each of at least one task flow generated. For each task flow, the adjustment unit 17 executes the processes of steps S181 to S187 shown in FIG. 7. Steps S14 and S15 following step S18A are the same as the processing flow Si. In a case where the number of robots is not changed (NO in step S15), steps S16, S17, S19 and S20 are executed similarly to the processing flow Si. Thus, the difference between the processing flows Si and S1A is whether the adjustment unit 17 adjusts the task flow in response to the user input or automatically without receiving the user input.

Program

Each functional module in the programming assistance device 4 is implemented by reading a planning program on the processor 161 or the memory 162 and causing the processor 161 to execute the program. The planning program includes codes for implementing each functional module of the programming assistance device 4. The processor 161 operates the input/output port 164 in accordance with the planning program and read and write data in the memory 162 or the storage 163. By such processing, each functional module of the programming assistance device 4 is realized.

The planning program may be provided after being fixedly recorded in a non-transitory storage medium such as a CD-ROM, a DVD-ROM, or a semiconductor memory. Alternatively, the planning program may be provided as a data signal superimposed on a carrier wave through a communication network.

As described above, a robot automation system according to an aspect of the present disclosure includes circuitry configured to: generate a plurality of task patterns that are candidates of a task flow for performing a job including a plurality of tasks by at least one robot, wherein each of the plurality of task patterns includes a corresponding relationship between the plurality of tasks and the at least one robot; calculate an estimated cycle time of the job based on a simulation in which the at least one robot performs the plurality of tasks, for each of the plurality of task patterns; compare the estimated cycle time for each of the plurality of task patterns with a preset reference cycle time for the job; and generate, as an operation program, at least one task flow for performing the job by the at least one robot, in response to comparing the preset reference cycle time for the job with the estimated cycle time for each of the plurality of task patterns.

A processor-executable method according to an aspect of the present disclosure includes: generating a plurality of task patterns that are candidates of a task flow for performing a job including a plurality of tasks by at least one robot, wherein each of the plurality of task patterns includes a corresponding relationship between the plurality of tasks and the at least one robot; calculating an estimated cycle time of the job based on a simulation in which the at least one robot performs the plurality of tasks, for each of the plurality of task patterns; comparing the estimated cycle time for each of the plurality of task patterns with a preset reference cycle time for the job; and generating, as an operation program, at least one task flow for performing the job by the at least one robot, in response to comparing the preset reference cycle time for the job with the estimated cycle time for each of the plurality of task patterns.

A non-transitory computer-readable storage medium according to an aspect of the present disclosure stores processor-executable instructions to: generate a plurality of task patterns that are candidates of a task flow for performing a job including a plurality of tasks by at least one robot, wherein each of the plurality of task patterns includes a corresponding relationship between the plurality of tasks and the at least one robot; calculate an estimated cycle time of the job based on a simulation in which the at least one robot performs the plurality of tasks, for each of the plurality of task patterns; compare the estimated cycle time for each of the plurality of task patterns with a preset reference cycle time for the job; and generate, as an operation program, at least one task flow for performing the job by the at least one robot, in response to comparing the preset reference cycle time for the job with the estimated cycle time for each of the plurality of task patterns.

According to such examples, since the task flow is generated based on the predetermined reference cycle time and the estimated cycle time, planning for the effective robot control may be realized. For example, the robot control conforming to the reference cycle time may be realized.

In some examples, the circuitry may be configured to generate a plurality of task flows in response to comparing the preset reference cycle time with the estimated cycle time for each of the plurality of task patterns, in which the plurality of task flows each include a task pattern for which a different estimated cycle time is calculated. In this case, a plurality of task flows may be generated based on the predetermined reference cycle time.

In some examples, the circuitry may be configured to generate the at least one task flow to include a task pattern for which the estimated cycle time is calculated to be less than or equal to the preset reference cycle time. This processing may obtain a task flow that is able to complete a job within a predetermined reference cycle time.

In some examples, the circuitry may be configured to calculate a cycle time difference between the estimated cycle time for each of the plurality of task patterns and the preset reference cycle time; identify a task pattern having a smallest cycle time difference among the plurality of task patterns; and generate the at least one task flow to include the identified task pattern having the smallest cycle time difference. This processing may obtain a task flow that is able to complete the job so as to conform to a predetermined reference cycle time. Such a task flow may improve an operating rate of the robot during the reference cycle time. This may therefore be an example of the effective robot control planning.

In some examples, the circuitry may be configured to compare the estimated cycle time for each of the plurality of task patterns to identify a task pattern having a smallest estimated cycle time among the plurality of task patterns; and generate the at least one task flow to include the identified task pattern having the smallest estimated cycle time. In this case, a task flow that is able to complete the job most quickly may be obtained. This may be an example of the effective robot control planning.

In some examples, the circuitry may be further configured to increase an allocated time for the at least one robot to perform the at least one task of the plurality of tasks constituting the at least one task flow. By increasing the allocated time of the task, the operating rate of the robot in the task flow may be improved. This may therefore be an example of the effective robot control planning.

In some examples, the circuitry may be configured to increase, for the at least one task flow, the allocated time of the at least one task so as to shorten a difference between the estimated cycle time and the preset reference cycle time. This processing may obtain more task flows that are able to complete a job so as to conform to a predetermined reference cycle time. Such a task flow may improve the operating rate of the robot during the reference cycle time. This may therefore be an example of the effective robot control planning.

In some examples, the plurality of tasks may include at least two predefined work tasks and a connection task positioned between the at least two predefined work tasks, and the circuitry may be configured to increase the allocated time of the connection task without changing the allocated times of the at least two predefined work tasks. This processing may improve the operating rate of the robot in the task flow without, for example, affecting the work task defined by a user.

In some examples, the circuitry may be configured to: identify a waiting time between each consecutively positioned task in the at least one task flow; identify a waiting section having a longest waiting time between two consecutively positioned tasks in the at least one task flow, wherein the at least one robot does not perform any task during the waiting section; and increase the allocated time of the at least one task positioned upstream from the waiting section in the at least one task flow, so as to shorten the longest waiting time. Since the longest waiting time is shortened by this processing, the operating rate of the robot may be increased.

In some examples, the waiting section having the longest waiting time may be located between the at least one task and a downstream task as the two consecutively positioned tasks in the at least one task flow. By adjusting the task positioned immediately before the waiting section, the waiting time may be easily shortened while suppressing the scope of the adjustment in the task flow.

In some examples, each of the plurality of tasks may include an adjustment possibility flag indicating whether the allocated time is adjustable, and the circuitry may be configured to increase the allocated time of the at least one task for which the allocated time is adjustable. Since the allocated time is increased only for a task whose allocated time is able to be changed, the adjustment may be executed without affecting other parts of the task flow.

In some examples, the circuitry may be configured to lower an operating speed of the robot in the at least one task so as to increase the allocated time. This method may be able to increase the allocated time in a simple manner. In addition, by lowering the operating speed of the robot, an increase in the product life of the robot may be expected.

In some examples, the circuitry may be configured to execute lengthen a path of the robot in the at least one task so as to increase the allocated time. This processing may increase the allocated time without lowering the operating speed of the robot. Since the operating speed of the robot is maintained, no extra load is applied to the robot.

In some examples, the circuitry may be configured to increase the allocated time of at least two tasks for which the allocated time is adjustable. Since the allocated time of the task is increased as much as possible, the operating rate of the robot may be increased more.

In some examples, the circuitry may be further configured to: receive a user input instructing an increase in the allocated time; and increase the allocated time in response to the user input. In this case, the allocated time of task may be adjusted in accordance with the user's request.

In some examples, the circuitry may be further configured to: calculate, for each of the at least one task flow, an evaluation value related to the at least one robot that executes the task flow; and output the evaluation value of the at least one task flow in order for a user to select one task flow from the at least one task flow. In this case, not only the task flow but also information related to the robot that executes the task flow may be obtained.

In some examples, the circuitry may be configured to calculate, for the at least one task flow, an operating rate that is a ratio of an operation time of the at least one robot to the estimated cycle time, as the evaluation value. In this case, information on how long the robot actually operates in each task flow may be obtained.

In some examples, the circuitry may be configured to calculate, for the at least one task flow, a product life of the at least one robot based on a load applied to a joint axis of the at least one robot in the task flow, as the evaluation value. In this case, information on how long the robot is able to be used may be obtained for each task flow.

In some examples, the circuitry may be configured to calculate, for the at least one task flow, a throughput of the at least one robot based on the estimated cycle time, as the evaluation value. In this case, information on how much additional value the robot produces may be obtained for each task flow.

In some examples, the circuitry may be configured to display the at least one task flow on a display device as a planning result. In this case, the planning result may be visually conveyed to a user.

In some examples, the circuitry may be configured to: receive a user input indicating a user selected task flow selected from the at least one task flow; and generate the operation program including the user selected task flow. In this case, the operation program may be generated according to the task flow determined by the user.

A robot system according to an aspect of the present disclosure includes: one or more robots; the above-mentioned robot automation system; and one or more robot controllers configured to operate the one or more robots based on the generated operation program. In this aspect, the effective robot control may be realized.

ADDITIONAL EXAMPLES

It is to be understood that not all aspects, advantages and features described herein may necessarily be achieved by, or included in, any one particular example. Indeed, having described and illustrated various examples herein, it should be apparent that other examples may be modified in arrangement and detail is omitted.

Although in the above examples, the programming assistance device 4 displays at least one task flow as the planning result (i.e., as the possible operation program) on the display device, the planning system or robot automation system may output the planning result in other manners. For example, the planning or robot automation system may store the planning result in a predetermined storage unit or may transmit the planning result to another computer.

The functional configuration of the planning system or robot automation system is not limited to the above examples. The planning method according to the present disclosure may be executed using a functional configuration different from the above examples.

The hardware configuration of the planning system or robot automation system is not limited to examples in which each functional module is implemented by executing a program. For example, at least part of the functional modules described above may be configured by a logic circuit specialized for the function, or may be configured by an application specific integrated circuit (ASIC) in which the logic circuit is integrated.

The processing procedure of the method executed by at least one processor is not limited to the above examples. For example, some of the above-described steps or processes may be omitted, or the steps may be executed in a different order. In addition, two or more of the above-described steps may be combined, or a part of the steps may be modified or deleted. Alternatively, another step may be executed in addition to the above-described steps.

In a case where the magnitude relationship between two numerical values is compared in a computer system or a computer, either of two criteria of "equal to or greater than" and "greater than" may be used, and either of two criteria of "equal to or less than" and "less than" may be used.

Regarding the above examples, the following appendices are provided by way of further illustration.

(Appendix 1) A planning system comprising:
a cycle time estimation unit configured to calculate an estimated cycle time of a job based on a simulation; and
a flow generation unit configured to generate at least one task flow for performing the job by at least one robot, based on a reference cycle time preset for the job and the estimated cycle time.

(Appendix 2) The planning system according to Appendix 1,
wherein the flow generation unit is configured to generate, as the at least one task flow, a plurality of task flows in which the estimated cycle times are different from each other, and
the system further comprises a result generation unit configured to store the plurality of task flows in a storage unit as a planning result.

(Appendix 3) A planning system according to Appendix 1 or 2, wherein the flow generation unit is configured to generate the at least one task flow in which the estimated cycle time is less than or equal to the reference cycle time.

(Appendix 4) The planning system according to Appendix 3, wherein the flow generation unit is configured to generate at least one task flow having a smallest difference between the estimated cycle time and the reference cycle time.

(Appendix 5) The planning system according to Appendix 3 or 4, wherein the flow generation unit is configured to generate at least one task flow having a smallest estimated cycle time.

(Appendix 6) The planning system according to any one of Appendices 1 to 5, further comprising an adjustment unit configured to increase, for at least one of the at least one task flow, an allocated time of at least one task of a plurality of tasks constituting the task flow.

(Appendix 7) The planning system according to Appendix 6, wherein the adjustment unit is configured to increase, for the at least one of the at least one task flow, the allocated time of the at least one task so as to shorten a difference between the estimated cycle time and the reference cycle time.

(Appendix 8) The planning system according to Appendix 7,
wherein the plurality of tasks includes a plurality of predefined work tasks and a connection task positioned between the work tasks, and
wherein the adjustment unit is configured to increase the allocated time of the connection task without changing the allocated time of each of the plurality of work tasks.

(Appendix 9) The planning system according to Appendix 7 or 8, wherein the adjustment unit is configured to:
select a waiting section having a longest waiting time between two of the tasks that are consecutively positioned; and
increase the allocated time of the at least one task positioned upstream from the waiting section, so as to shorten the longest waiting time.

(Appendix 10) The planning system according to Appendix 9, wherein the adjustment unit is configured to increase the allocated time of the task positioned immediately before the waiting section.

(Appendix 11) The planning system according to any one of Appendices 7 to 10,
wherein each of the plurality of tasks includes an adjustment possibility flag indicating whether the allocated time is able to be increased, and
the adjustment unit is configured to increase the allocated time of the at least one task for which the allocated time is able to be increased.

(Appendix 12) The planning system according to any one of Appendices 7 to 11, wherein the adjustment unit is configured to lower an operating speed of the robot in the at least one task so as to increase the allocated time.

(Appendix 13) The planning system according to any one of Appendices 7 to 12, wherein the adjustment unit is configured to lengthen a path of the robot in the task so as to increase the allocated time.

(Appendix 14) The planning system according to any one of Appendices 7 to 13, further comprising an adjustment control unit configured to cause the adjustment unit to increase the allocated time of the at least one task of the plurality of tasks, in a case where the allocated time of the at least one task is able to be increased.

(Appendix 15) The planning system according to any one of Appendices 7 to 14, further comprising a receiving unit configured to receive a user input instructing an increase in the allocated time,
wherein the adjustment unit is configured to increase the allocated time in response to the user input.

(Appendix 16) The planning system according to Appendices 1 to 15, further comprising an evaluation unit configured to calculate, for each of the at least one task flow, an evaluation value related to the at least one robot performing the task flow.

(Appendix 17) The planning system according to the Appendix 16, wherein the evaluation unit is configured to calculate, for each of the at least one task flow, an operating rate that is a ratio of an operation time of the at least one robot to the estimated cycle time, as the evaluation value.

(Appendix 18) The planning system according to the appendix 16 or 17, wherein the evaluation unit is configured to calculate, for each of the at least one task flow, a product life of the at least one robot based on a load applied to a joint axis of the at least one robot in the task flow, as the evaluation value.

(Appendix 19) The planning system according to Appendices 14 to 16, wherein the evaluation unit is configured to calculate, for each of the at least one task flow, a throughput of the at least one robot based on the estimated cycle time, as the evaluation value.

(Appendix 20) The planning system according to any one of Appendices 1 to 19, further comprising a display control unit configured to display the at least one task flow as a planning result on a display device.

(Appendix 21) The planning system according to any one of Appendices 1 to 20, further comprising a program generation unit configured to generate an operation program for causing one or more of the robots to perform a task flow determined by a user among the at least one task flow.

(Appendix 22) A robot system comprising:
one or more robots;
the planning system according to Appendix 21; and
one or more robot controllers configured to operate the one or more robots based on the generated operation program.

(Appendix 23) A planning method executed by a planning system comprising at least one processor, the planning method comprising:
calculating an estimated cycle time of a job based on a simulation; and
generating at least one task flow for performing the job by at least one robot, based on a reference cycle time preset for the job and the estimated cycle time.

(Appendix 24) A planning program for causing a computer to execute:
calculating an estimated cycle time of a job based on a simulation; and
generating at least one task flow for performing the job by at least one robot, based on a reference cycle time preset for the job and the estimated cycle time.

What is claimed is:

1. A robot automation system comprising circuitry configured to:
generate a plurality of task patterns that are candidates of a task flow for performing a job including a plurality of tasks by at least one robot, wherein each of the plurality of task patterns includes a corresponding relationship between the plurality of tasks and the at least one robot, and wherein the plurality of tasks includes at least two predefined work tasks and a connection task positioned between the at least two predefined work tasks;
calculate an estimated cycle time of the job based on a simulation in which the at least one robot performs the plurality of tasks, for each of the plurality of task patterns;
compare the estimated cycle time for each of the plurality of task patterns with a preset reference cycle time for the job;
generate, as an operation program, at least one task flow for performing the job by the at least one robot, in response to comparing the preset reference cycle time for the job with the estimated cycle time for each of the plurality of task patterns; and
increase an allocated time for the at least one robot to perform the connection task so as to shorten a difference between the estimated cycle time and the preset reference cycle time, without changing allocated times for the at least one robot to perform the at least two predefined work tasks.

2. The system according to claim 1, wherein the circuitry is configured to generate a plurality of task flows in response to comparing the preset reference cycle time with the estimated cycle time for each of the plurality of task patterns, in which the plurality of task flows each include a task pattern for which a different estimated cycle time is calculated.

3. The system according to claim 1, wherein the circuitry is configured to generate the at least one task flow to include a task pattern for which the estimated cycle time is calculated to be less than or equal to the preset reference cycle time.

4. The system according to claim 1, wherein the circuitry is configured to:
calculate a cycle time difference between the estimated cycle time for each of the plurality of task patterns and the preset reference cycle time;
identify a task pattern having a smallest cycle time difference among the plurality of task patterns; and
generate the at least one task flow to include the identified task pattern having the smallest cycle time difference.

5. The system according to claim 1, wherein the circuitry is configured to:
compare the estimated cycle time for each of the plurality of task patterns to identify a task pattern having a smallest estimated cycle time among the plurality of task patterns; and
generate the at least one task flow to include the identified task pattern having the smallest estimated cycle time.

6. The system according to claim 1, wherein the circuitry is configured to:
identify a waiting time between each consecutively positioned task in the at least one task flow;
identify a waiting section having a longest waiting time between two consecutively positioned tasks in the at least one task flow, wherein the at least one robot does not perform any task during the waiting section; and
increase the allocated time of the at least one task positioned upstream from the waiting section in the at least one task flow, so as to shorten the longest waiting time.

7. The system according to claim 6, wherein the waiting section having the longest waiting time is located between the at least one task and a downstream task as the two consecutively positioned tasks in the at least one task flow.

8. The system according to claim 1,
wherein each of the plurality of tasks includes an adjustment possibility flag indicating whether the allocated time is adjustable, and
wherein the circuitry is configured to increase the allocated time of the at least one task for which the allocated time is adjustable.

9. The system according to claim 8, wherein the circuitry is configured to increase the allocated time of at least two tasks for which the allocated time is adjustable.

10. The system according to claim 1, wherein the circuitry is configured to increase the allocated time by selectively lowering an operating speed of the at least one robot or lengthening a path of the at least one robot in performing the at least one task.

11. The system according to claim 1, wherein the circuitry is further configured to:
calculate, for each of the at least one task flow, an evaluation value related to the at least one robot that performs the task flow; and
output the evaluation value of the at least one task flow in order for a user to select one task flow from the at least one task flow.

12. The system according to claim 11, wherein the circuitry is configured to calculate, for the at least one task flow, an operating rate that is a ratio of an operation time of the at least one robot to the estimated cycle time, as the evaluation value.

13. The system according to claim 11, wherein the circuitry is configured to calculate, for the at least one task flow, a product life of the at least one robot based on a load applied to a joint axis of the at least one robot in the task flow, as the evaluation value.

14. The system according to claim 11, wherein the circuitry is configured to calculate, for the at least one task flow, a throughput of the at least one robot based on the estimated cycle time, as the evaluation value.

15. The system of claim 1, wherein the circuitry is configured to:
receive a user input indicating a user selected task flow selected from the at least one task flow; and
generate the operation program including the user selected task flow.

16. A processor-executable method comprising:
generating a plurality of task patterns that are candidates of a task flow for performing a job including a plurality of tasks by at least one robot, wherein each of the plurality of task patterns includes a corresponding relationship between the plurality of tasks and the at least one robot, and wherein the plurality of tasks includes at least two predefined work tasks and a connection task positioned between the at least two predefined work tasks;
calculating an estimated cycle time of the job based on a simulation in which the at least one robot performs the plurality of tasks, for each of the plurality of task patterns;
comparing the estimated cycle time for each of the plurality of task patterns with a preset reference cycle time for the job;
generating, as an operation program, at least one task flow for performing the job by the at least one robot, in response to comparing the preset reference cycle time for the job with the estimated cycle time for each of the plurality of task patterns; and
increasing an allocated time for the at least one robot to perform the connection task so as to shorten a difference between the estimated cycle time and the preset reference cycle time, without changing allocated times for the at least one robot to perform the at least two predefined work tasks.

17. A non-transitory computer-readable storage medium storing processor-executable instructions to:
generate a plurality of task patterns that are candidates of a task flow for performing a job including a plurality of tasks by at least one robot, wherein each of the plurality of task patterns includes a corresponding relationship between the plurality of tasks and the at least one robot, and wherein the plurality of tasks includes at least two predefined work tasks and a connection task positioned between the at least two predefined work tasks;
calculate an estimated cycle time of the job based on a simulation in which the at least one robot performs the plurality of tasks, for each of the plurality of task patterns;
compare the estimated cycle time for each of the plurality of task patterns with a preset reference cycle time for the job;
generate, as an operation program, at least one task flow for performing the job by the at least one robot, in response to comparing the preset reference cycle time for the job with the estimated cycle time for each of the plurality of task patterns; and
increase an allocated time for the at least one robot to perform the connection task so as to shorten a difference between the estimated cycle time and the preset reference cycle time, without changing allocated times for the at least one robot to perform the at least two predefined work tasks.

* * * * *